United States Patent [19]
Hamburg et al.

[11] Patent Number: 5,499,500
[45] Date of Patent: Mar. 19, 1996

[54] ENGINE AIR/FUEL CONTROL SYSTEM WITH CATALYTIC CONVERTER AND EXHAUST GAS OXYGEN SENSOR MONITORING

[75] Inventors: Douglas R. Hamburg, Bloomfield; Eleftherios M. Logothetis, Birmingham, both of Mich.

[73] Assignee: Ford Motor Company, Dearborn, Mich.

[21] Appl. No.: 358,509

[22] Filed: Dec. 19, 1994

[51] Int. Cl.[6] .................................................. F01N 3/20
[52] U.S. Cl. .............................. 60/274; 60/276; 60/277; 60/278; 60/285
[58] Field of Search .......................... 60/274, 278, 285, 60/277, 276

[56] References Cited

U.S. PATENT DOCUMENTS

| | | |
|---|---|---|
| 5,099,647 | 3/1992 | Hamburg .................................. 60/277 |
| 5,268,086 | 12/1993 | Hamburg et al. ...................... 204/429 |
| 5,313,791 | 5/1994 | Hamburg .................................. 60/276 |
| 5,363,091 | 11/1994 | Kotwicki ................................. 60/276 |
| 5,375,413 | 12/1994 | Hamburg ................................. 60/276 |
| 5,379,590 | 1/1995 | Hamburg ................................. 60/276 |

*Primary Examiner*—Douglas Hart
*Attorney, Agent, or Firm*—Allan J. Lippa; Roger L. May

[57] ABSTRACT

An engine air/fuel control system is shown (300–428) responsive to a feedback variable derived (410–428) from an exhaust gas oxygen sensor (16) positioned upstream of a catalytic converter (20). A non-catalytic exhaust gas oxygen sensor (24) having a non-catalytic electrode (490) positioned in the engine exhaust downstream of the converter (20) is coupled to a current pumping circuit (28). Current is pumped into an electrode of the downstream sensor (24) shifting its output step change towards richer air/fuel ratios. Pumping current is gradually increased in amplitude until the downstream sensor (24) incurs a change in its output state (602–634). The pumping current occurring at the time of such change in output states provides a measurement of catalyst efficiency.

15 Claims, 5 Drawing Sheets

5,499,500

ENGINE AIR/FUEL CONTROL SYSTEM WITH CATALYTIC CONVERTER AND EXHAUST GAS OXYGEN SENSOR MONITORING

FIELD OF THE INVENTION

The field of the invention relates to controlling air/fuel ratio while indicating degraded catalytic converter operation.

BACKGROUND OF THE INVENTION

Air/fuel control systems are known in which fuel delivered to the engine is adjusted by a feedback variable derived from an exhaust gas oxygen sensor to maintain a desired air/fuel ratio. An approach to concurrently control air/fuel ratio while monitoring the converter for degraded operation is disclosed in U.S. Pat. No. 5,268,086. Air/fuel operation proceeds for a time with the feedback variable derived from a catalytic exhaust gas oxygen sensor and then proceeds for another time with the feedback variable derived from a non-catalytic exhaust gas oxygen sensor. The output of the two sensors are compared to determine converter fault.

The inventors herein have recognized numerous problems with the above approaches. One problem is that only a go or no go indication is provided rather than an indication of actual converter efficiency. It is preferable to know the actual converter efficiency so that measures can be taken to improve converter efficiency. Another problem with those prior approaches which substituted a non-catalytic exhaust gas oxygen sensor in the feedback loop during engine air/fuel control, is that such sensor will shift engine air/fuel ratio lean, thereby increasing emissions.

SUMMARY OF THE INVENTION

An object of the invention herein is to provide indications of actual converter efficiency while concurrently maintaining air/fuel control within the efficiency window of a catalytic converter. The above object is achieved, and problems of prior approaches overcome, by providing both a control system and method for controlling air/fuel ratio and concurrently indicating catalytic converter efficiency. In one particular aspect of the invention, the method comprises the steps of: adjusting fuel delivered to the engine to maintain engine/air fuel ratio at a desired air/fuel ratio; pumping current at a gradually increasing amplitude into an electrode of an exhaust gas oxygen sensor having a non-catalytic electrode positioned in the engine exhaust downstream of the converter until an output of the exhaust gas oxygen sensor changes output states; and providing an indication of converter efficiency in relation to the pumping current amplitude occurring at the change in exhaust gas oxygen sensor output states.

Preferably, an indication of degradation in one of the exhaust gas oxygen sensors is provided when the non-catalytic sensor output remains in a high output state while the pumping current increases beyond a predetermined maximum. And, preferably, the method further includes a step of retarding ignition timing or increasing exhaust gas recirculation by preselected amounts when the indication of converter efficiency is less than a preselected amount.

An advantage of the above aspect of the invention is that actual converter efficiency is provided rather than merely a go or no go indication. Another advantage is that monitoring the exhaust gas oxygen sensors is also provided. Still another advantage is that engine operation is altered, such as by retarding ignition timing, to maintain minimal emissions in the event of converter degradation.

In another aspect of the invention, the system comprises: a feedback controller adjusting fuel inducted into the engine to maintain a desired air/fuel ratio in response to a feedback variable generated from an upstream exhaust gas oxygen sensor positioned upstream of the converter; a downstream exhaust gas oxygen sensor having a non-catalytic electrode coupled to the engine exhaust downstream of the converter, the downstream exhaust gas oxygen sensor having an output step change occurring at a preselected air/fuel ratio leaner than the desired air/fuel ratio; a circuit applying current to an electrode of the downstream exhaust gas oxygen sensor so that the step change output occurs at a leaner air/fuel ratio than the preselected air/fuel ratio, the circuit gradually increasing amplitude of the current until the downstream exhaust gas oxygen sensor output changes states; and means providing an indication of converter efficiency in relation to the pumping current amplitude occurring at the change in downstream exhaust gas oxygen sensor states; and an ignition controller retarding ignition timing a predetermined amount when the converter efficiency indication is less than a preselected amount.

An advantage of the above aspect of the invention is that actual converter efficiency is provided. Another advantage is that ignition timing is retarded when converter efficiency is sufficiently degraded to maintain minimal emissions.

BRIEF DESCRIPTION OF THE DRAWINGS

The above object and advantages of the invention will be more clearly understood by reading an example of an embodiment in which the invention is used to advantage with reference to the attached drawings wherein.

DESCRIPTION OF AN EMBODIMENT

Figure 1:
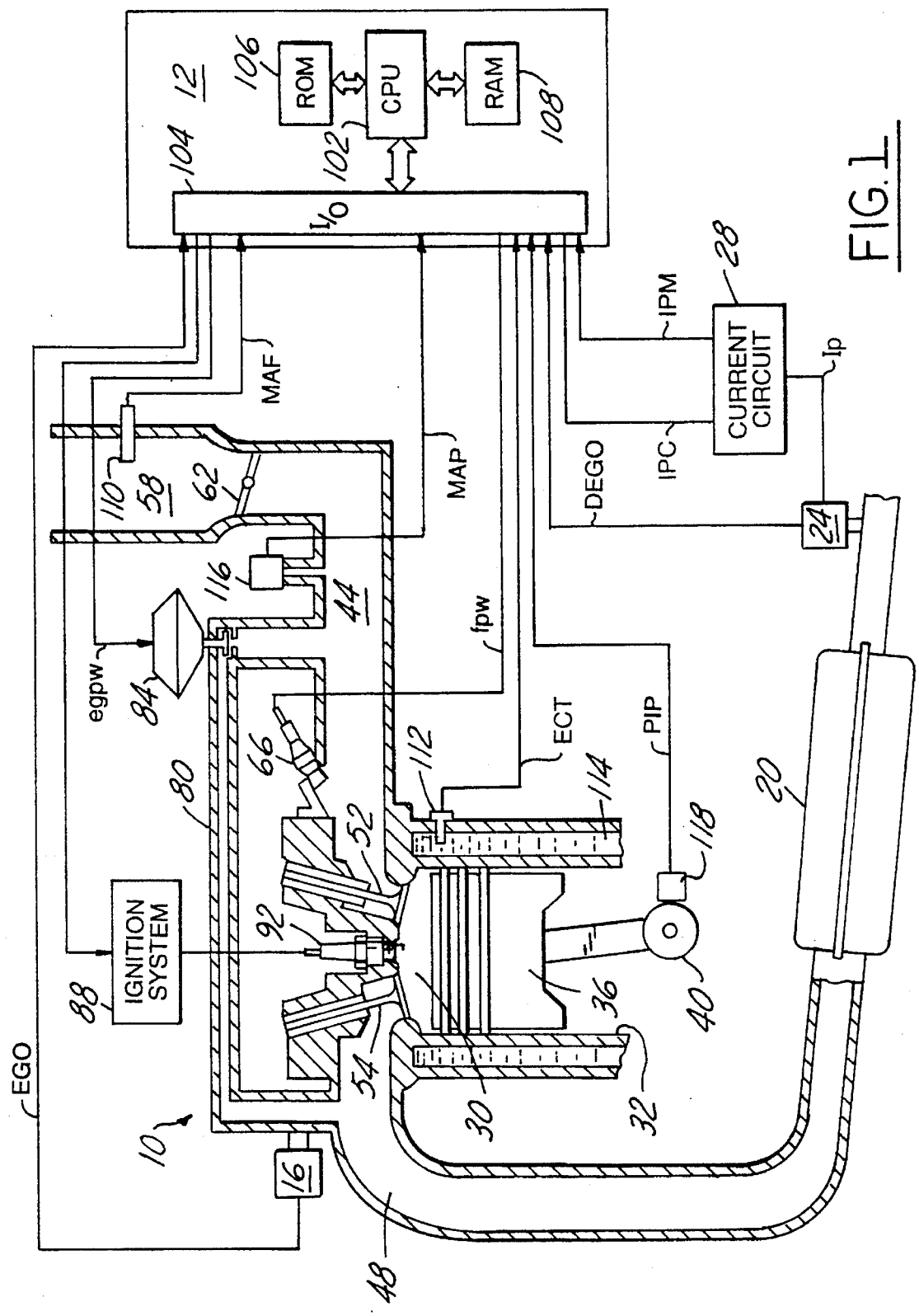
FIG. 1 is a block diagram of an embodiment wherein the invention is used to advantage.

Internal combustion engine 10 comprising a plurality of cylinders, one cylinder of which is shown in FIG. 1, is controlled by electronic engine controller 12. In general terms which are described later herein with particular reference to FIGS. 2–3, controller 12 controls engine air/fuel ratio in response to a feedback variable derived from catalytic exhaust gas oxygen sensor 16. Concurrently, as described later herein with particular reference to FIGS. 4–6, controller 12 indicates efficiency of catalytic converter 20 in response to non-catalytic exhaust gas oxygen sensor 24 by pumping current into sensor 24 via current generator 28 until sensor 24 changes output states.

Continuing with FIG. 1, engine 10 includes combustion chamber 30 and cylinder walls 32 with piston 36 positioned therein and connected to crankshaft 40. Combustion chamber 30 is shown communicating with intake manifold 44 and exhaust manifold 48 via respective intake valve 52 and exhaust valve 54. Intake manifold 44 is shown communicating with throttle body 58 via throttle plate 62. Intake manifold 44 is also shown having fuel injector 66 coupled thereto for delivering liquid fuel in proportion to the pulse width of signal FPW from controller 10. Fuel is delivered to fuel injector 66 by a conventional fuel system (not shown) including a fuel tank, fuel pump, and fuel rail (not shown).

Exhaust gas recirculation passageway 80 is shown communicating between exhaust manifold 48 and intake manifold 44. Exhaust gas recirculation valve 84 is shown coupled to exhaust gas passageway 80 for controlling the flow of recirculated exhaust gases in proportion to signal egpw from controller 12. Typically, controller 12 sets signal egpw to be proportional to a measurement of mass air flow (MAF) inducted into engine 12 so that the flow of recirculated exhaust gases is a proportion of the inducted airflow.

Conventional distributorless ignition system 88 provides ignition spark to combustion chamber 30 via spark plug 92 in response to controller 12.

Catalytic type exhaust gas oxygen sensor 16 is shown coupled to exhaust manifold 48 upstream of catalytic converter 20. Sensor 16 provides signal EGO to controller 12 which converts signal EGO into a two-state signal. A high voltage state of converted signal EGO indicates exhaust gases are rich of a desired air/fuel ratio and a low voltage state of converted signal EGO indicates exhaust gases are lean of the desired air/fuel ratio. Typically, the desired air/fuel ratio is selected as stoichiometry which falls within the peak efficiency window of catalytic converter 20.

Figure 4:
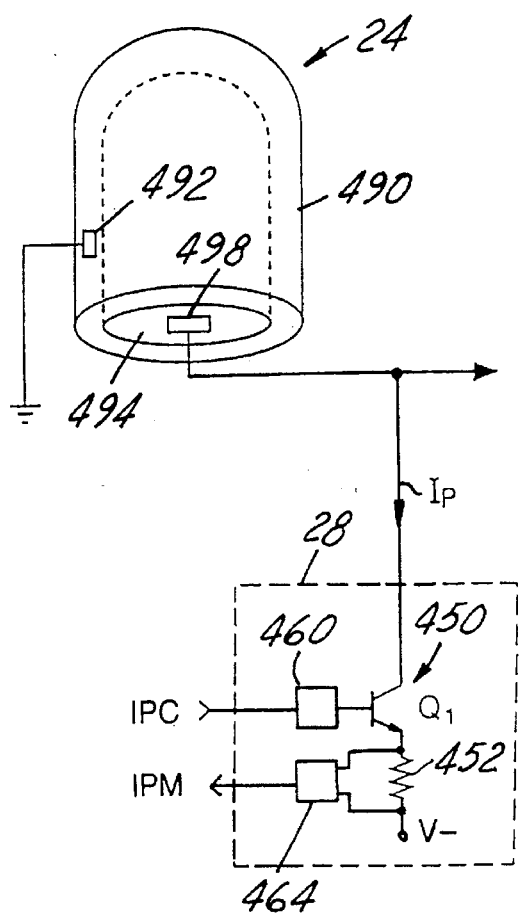
FIG. 4 discloses a current pumping circuit coupled to an electrode of the non-catalytic exhaust gas oxygen sensor described herein.

Non-catalytic type exhaust gas oxygen sensor 24 includes a non-catalytic electrode coupled to the engine exhaust downstream of catalytic converter 20 (also see FIG. 4). Sensor 24 provides signal DEGO to controller 12. As described in greater detail latter herein with particular reference to FIG. 4, the step change in signal DEGO between rich and lean indicating states is shifted towards richer air/fuel ratios in proportion to pumping current Ip. Current circuit 28 couples pumping current Ip to an electrode of sensor 24. Pumping current Ip is provided by current circuit 28 in proportion to voltage Vp from controller 12.

Controller 12 is shown in FIG. 1 as a conventional microcomputer including: microprocessor unit 102, input/output ports 104, read only memory 106, random access memory 108, and a conventional data bus. Controller 12 is shown receiving various signals from sensors coupled to engine 10, in addition to those signals previously discussed, including: measurements of inducted mass air flow (MAF) from mass air flow sensor 110 coupled to throttle body 58; engine coolant temperature (ECT) from temperature sensor 112 coupled to cooling sleeve 114; a measurement of manifold pressure (MAP) from manifold pressure sensor 116 coupled to intake manifold 44; and a profile ignition pickup signal (PIP) from Hall effect sensor 118 coupled to crankshaft 40.

Figure 2:
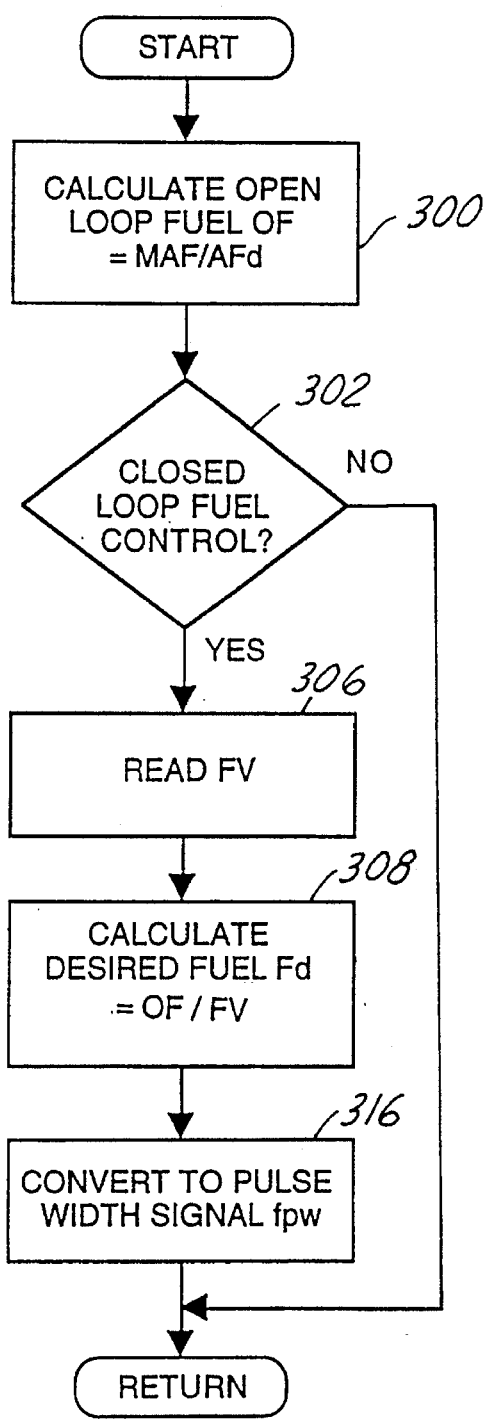
FIGS. 2–3 are high level flow charts of various operations performed by a portion of the embodiment shown in FIG. 1.

The liquid fuel delivery routine executed by controller 12 for controlling engine 10 is now described beginning with reference to the flowchart shown in FIG. 2. An open loop calculation of desired liquid fuel (signal OF) is calculated in step 300. More specifically, the measurement of inducted mass airflow (MAF) from sensor 110 is divided by a desired air/fuel ratio (AFd) which, in this example, is correlated with stoichiometric combustion. A determination is made that closed loop or feedback control is desired (step 302), by monitoring engine operating parameters such as temperature ECT. Desired fuel quantity, or fuel command, for delivering fuel to engine 10 is generated by dividing feedback variable FV into the previously generated open loop calculation of desired fuel (signal OF) as shown in step 308. Fuel command or desired fuel signal Fd is then converted to pulse width signal fpw (step 316) for actuating fuel injector 66.

Figure 3:
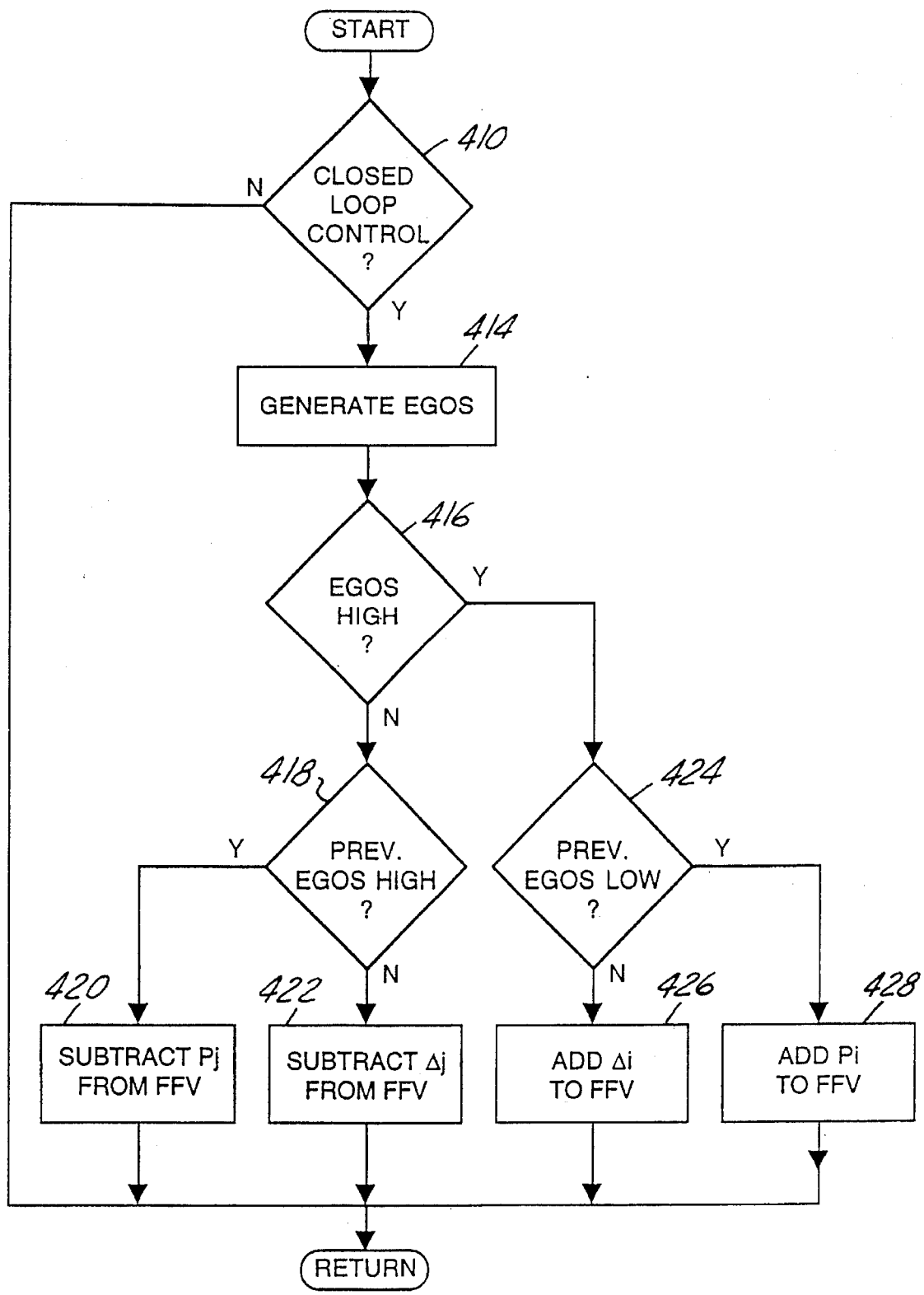

The air/fuel feedback routine executed by controller 12 to generate fuel feedback variable FV is now described with reference to the flowchart shown in FIG. 3. Signal EGO is read, after determining that closed loop air/fuel control is desired in step 410. When signal EGO is low (step 416), but was high during the previous background loop of controller 12 (step 418), preselected proportional term Pj is subtracted from feedback variable FV (step 420). When signal EGO is low (step 416), and was also low during the previous background loop (step 418), preselected integral term $\Delta j$, is subtracted from feedback variable FV (step 422).

Similarly, when signal EGOS is high (step 416), and was also high during the previous background loop of controller 12 (step 424), integral term $\Delta j$, is added to feedback variable FV (step 426). When signal EGOS is high (step 416), but was low during the previous background loop (step 424), proportional term Pi is added to feedback variable FV (step 428).

In accordance with the above described operation, feedback variable FV is generated from a proportional plus integral controller (PI) responsive to exhaust gas oxygen sensor 16. The integration steps for integrating signal EGO in a direction to cause a lean air/fuel correction are provided by integration steps $\Delta i$, and the proportional term for such correction provided by $P_i$. Similarly integral term $\Delta j$ and proportional term $P_j$ cause rich air/fuel correction.

Referring now to FIG. 4, pumping current generator 28 provides pumping current Ip to sensor 24 in proportion to the magnitude of signal IPC from controller 12. A measurement of the pumping current supplied by current circuit 28 is provided by signal IPM as described below.

Current circuit 28 is shown having the collector terminal of transistor 450 coupled to electrode lead 498 for pumping current Ip thereto. Resistor 452 is shown coupled in series between a voltage reference, such as −12 volts, and the emitter terminal of transistor 450. The base terminal of transistor 450 is shown coupled to controller 12 via digital to analog converter 464 for receiving signal IPC as previously described. Current circuit 28 provides signal IPC which is a measurement of pumping current Ip. More specifically, the voltage drop across resistor 452 is converted to signal IPM via analog to digital converter 464.

Continuing with FIG. 4, a perspective sectional view of sensor 24 is shown having non-catalytic electrode 490 positioned on its outer surface. Electrode lead 492 is shown coupled between electrode 490 and signal ground. Non-catalytic electrode 490 communicates with the engine exhaust downstream of converter 20 as previously described herein. A second electrode (494) is shown positioned on the inner surface of sensor 24 for communicating with ambient air to provide a reference value. Lead 498 is shown coupled to electrode 490 for providing electrical connection to current circuit 28.

Figure 5B:
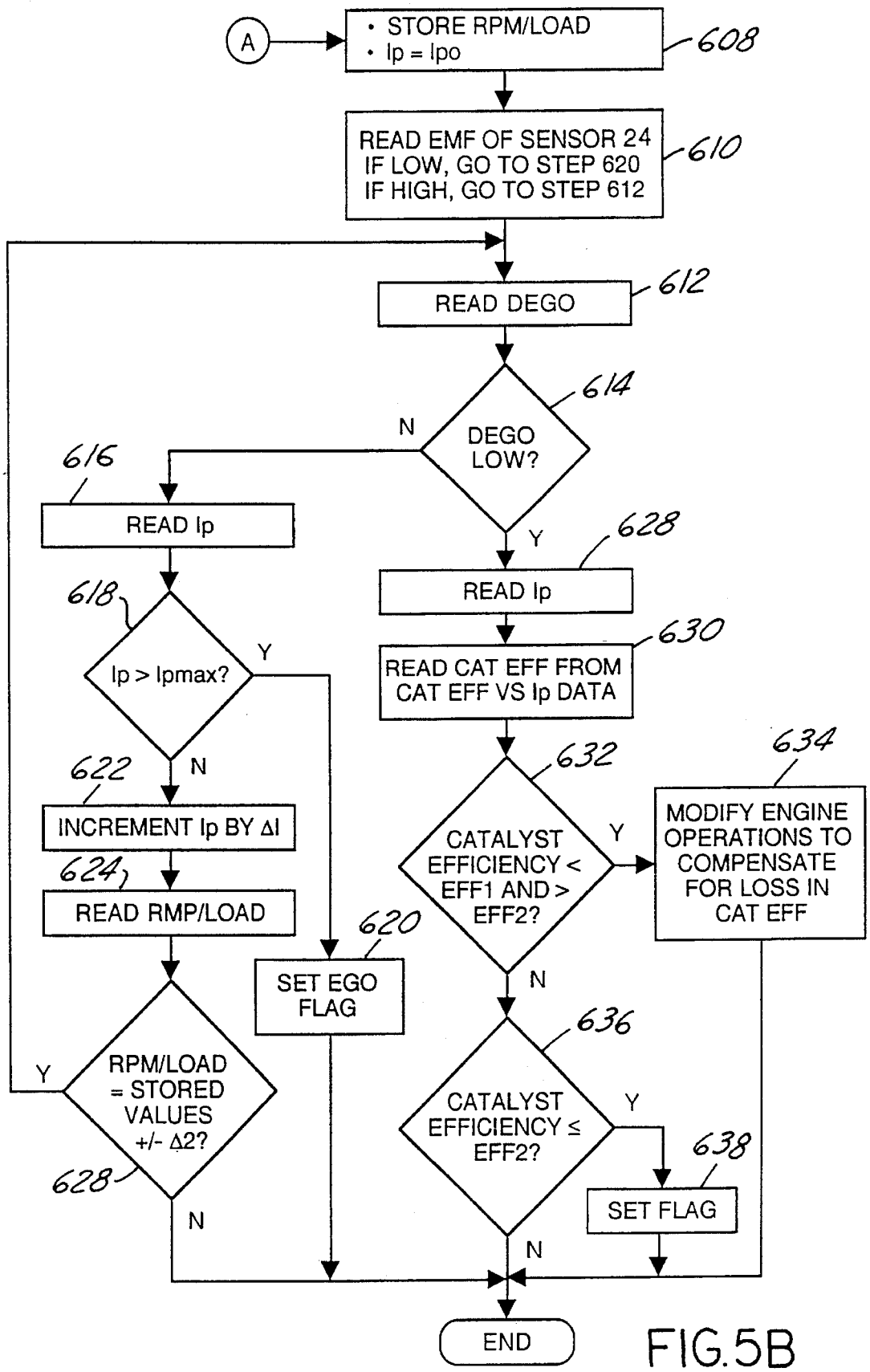
FIG. 5 is a high level flow charts of various operations performed by a portion of the embodiment shown in FIG. 1.
Figure 5A:
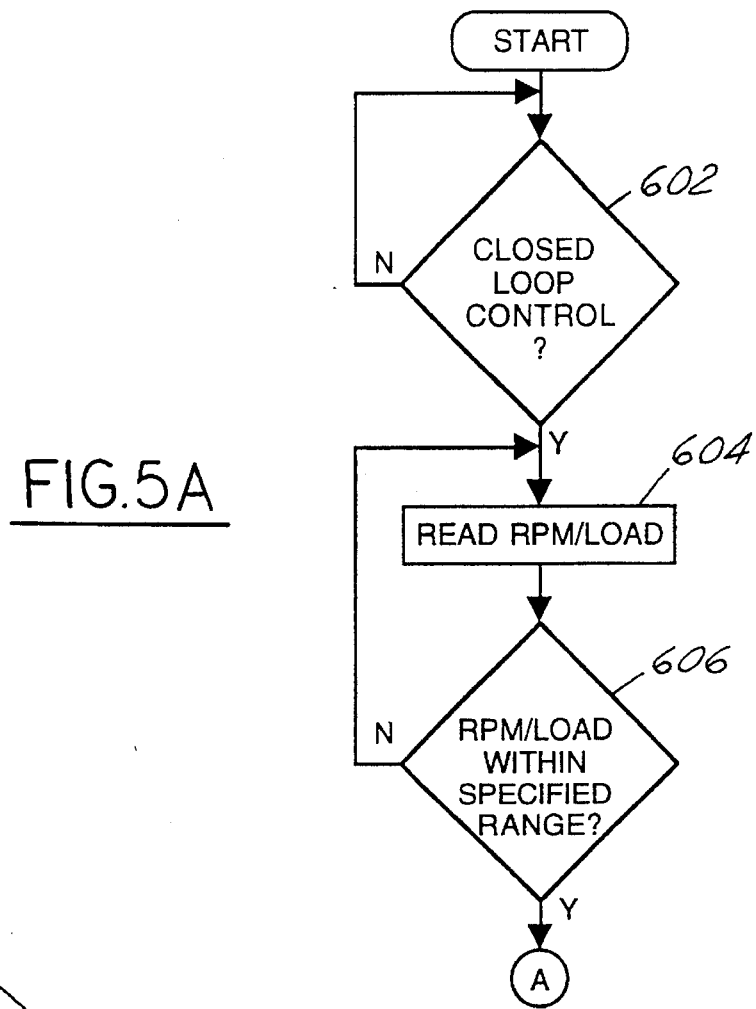

Referring now to FIG. 5, a flowchart for indicating efficiency of converter 20 is provided in addition to monitoring exhaust gas oxygen sensors 16 and 24. After closed loop or feedback air/fuel control is commenced (602), rpm and load of engine 10 are read at 604. If engine rpm and load are within a specified range (608), the rpm and load readings are stored at 608.

Pumping current IP is also set equal to an initial pumping current Ipo as an initial test of the ego sensors at 608. Initial current Ipo is set so that the shift towards a rich air/fuel ratio of sensor 24 will not be sufficient to cause the resulting shift in the output step change of sensor 24 to cross stoichiometry. Accordingly, if the output of sensor 24 switches low after initial pumping current Ipo is applied (610), then either downstream sensor 24 or upstream sensor 16 are degraded. Upstream sensor 16 may be degraded if the engine air/fuel ratio is not being maintained by feedback at stoichiometry. An EGO maintenance flag is then set at step 612. On the other hand, if the output of downstream sensor 24 remains high (610), the subroutine continues as follows.

Signal DGO is read at 612 and if it is high (614), current Ip is read at 616. If current Ip is greater than maximum current Ipmax, (618) the EGO flag is set at 620. This occurs because maximum current Ipmax is set so that even if the efficiency of converter 20 is at zero, the pumping current Ip would be sufficient to shift the step change in output of downstream sensor 24 sufficiently rich to cause the sensor output to shift low. If it does not shift low, then either downstream sensor 24 is degraded or upstream sensor 24 is not maintaining the engine air/fuel ratio at stoichiometry.

On the other hand, if pumping current Ip is less than maximum current Ipmax, pumping current Ip is incremented by $\Delta 1$ at 622. If engine speed and load are within values previously stored in step 608 plus or minus $\Delta 2$ (626), it is apparent that the engine is operating at steady state and the above described operations (614–620) are continued. On the other hand, if the rpm and load values have varied beyond $\Delta 2$ from the previously stored values, then the subroutine is exited.

Figure 6:
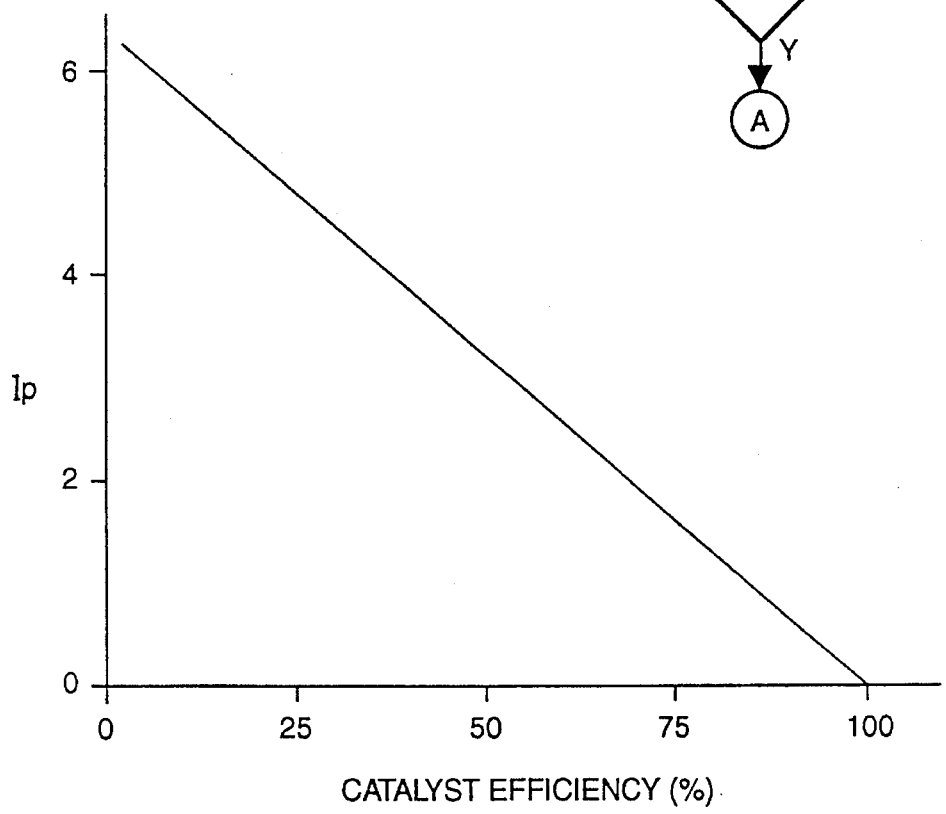
FIG. 6 is a graphical representation of converter efficiency vs. pumping current.

The operation described above with reference to steps 614–626 continues until signal DEGO transitions to a low state (614). At such time, pumping current Ip is read (628) and catalyst efficiency determined from a map of catalyst efficiency versus pumping current Ip (630). An example of such a map is shown in FIG. 6.

If catalyst efficiency is within a band defined on the upper limit by efficiency EFF1 and the lower limit by efficiency EFF2 (632), engine operation is modified to compensate for the loss in catalyst efficiency at 634. In this particular example, such modification includes retarding ignition timing by a preselected amount and increasing EGR by a preselected amount. In addition, in air/fuel control systems which modulate the air/fuel ratio, such as by modulating the feedback variable, the modulation is ceased when catalyst efficiency falls within the above described bands.

If catalyst efficiency falls below lower limit EFF2, a flag is set at 638 indicating that maintenance is desired. When catalyst efficiency is above the upper limit described by efficiency EFF1, the subroutine is exited and no action is required.

This concludes a description of an example of operation in which the invention claimed herein is used to advantage. Those skilled in the art will bring to mind many modifications and alterations to the example presented herein without departing from the spirit and scope of the invention. Accordingly, it is intended that the invention be limited only by the following claims.

What is claimed:

1. A method for controlling engine air/fuel ratio and concurrently monitoring efficiency of a catalytic converter coupled to the engine exhaust, comprising the steps of:

adjusting fuel delivered to the engine to maintain engine/air fuel ratio at a desired air/fuel ratio;

pumping current at a gradually increasing amplitude into an electrode of an exhaust gas oxygen sensor having a non-catalytic electrode positioned in the engine exhaust downstream of the converter until an output of said exhaust gas oxygen sensor changes output states; and providing an indication of converter efficiency in relation to said pumping current amplitude occurring at said change in exhaust gas oxygen sensor output states.

2. The method recited in claim 1 wherein said fuel adjustment step is responsive to a catalytic exhaust gas oxygen sensor positioned upstream of the converter.

3. The method recited in claim 2 further comprising a step of indicating converter degradation when said indication of converter efficiency is less than a predetermined efficiency.

4. The method recited in claim 2 further comprising a step of pumping a predetermined fixed amount of current into said electrode before said step of pumping current at a gradually increasing amplitude and indicating degradation in one of said exhaust gas oxygen sensors if said catalytic exhaust gas oxygen sensor output changes output states with said predetermined fixed current.

5. The method recited in claim 2 further comprising a step of indicating degradation in one of said exhaust gas oxygen sensors when said catalytic exhaust gas oxygen sensor output remains in a high output state when said pumping current is increased to a maximum predetermined value.

6. The method recited in claim 1 further comprising a step of retarding engine ignition timing a preselected amount when said converter efficiency indication is less than a preselected efficiency.

7. The method recited in claim 1 further comprising a step of increasing engine exhaust gas recirculation a preselected amount when said converter efficiency indication is less than a preselected efficiency.

8. The method recited in claim 1 further comprising a step of retarding ignition timing and increasing exhaust gas recirculation when said converter efficiency indication is less than a preselected efficiency and greater than a predetermined efficiency, said preselected efficiency being greater than said predetermined efficiency.

9. The method recited in claim 1 further comprising a step of removing any modulation of said adjusting step when said converter efficiency indication is less than a preselected efficiency.

10. A system for controlling an engine and indicating efficiency on a catalytic converter coupled to the engine exhaust, comprising:

a feedback controller adjusting fuel inducted into the engine to maintain a desired air/fuel ratio in response to a feedback variable generated from an upstream exhaust gas oxygen sensor positioned upstream of the converter;

a downstream exhaust gas oxygen sensor having a non-catalytic electrode coupled to the engine exhaust downstream of the converter, said downstream exhaust gas oxygen sensor having an output step change occurring at a preselected air/fuel ratio leaner than said desired air/fuel ratio;

a circuit applying current to an electrode of said downstream exhaust gas oxygen sensor so that said step change output occurs at a leaner air/fuel ratio than said preselected air/fuel ratio, said circuit gradually increasing amplitude of said current until said downstream exhaust gas oxygen sensor output changes states; and means providing an indication of converter efficiency in relation to said pumping current amplitude occurring at said change in downstream exhaust gas oxygen sensor states.

11. The system recited in claim 10 wherein said indicating providing means further indicates degradation in one of said exhaust gas oxygen sensors when said downstream sensor output remains in a high output state when said pumping current exceeds a predetermined maximum current.

12. The system recited in claim 10 wherein said indicating providing means further indicates converter degradation when said indication of converter efficiency is less than a predetermined efficiency.

13. A system for controlling an engine and indicating efficiency on a catalytic converter coupled to the engine exhaust, comprising:
- a feedback controller adjusting fuel inducted into the engine to maintain a desired air/fuel ratio in response to a feedback variable generated from an upstream exhaust gas oxygen sensor positioned upstream of the converter;
- a downstream exhaust gas oxygen sensor having a non-catalytic electrode coupled to the engine exhaust downstream of the converter, said downstream exhaust gas oxygen sensor having an output step change occurring at a preselected air/fuel ratio leaner than said desired air/fuel ratio;
- a circuit applying current to an electrode of said downstream exhaust gas oxygen sensor so that said step change output occurs at a leaner air/fuel ratio than said preselected air/fuel ratio, said circuit gradually increasing amplitude of said current until said downstream exhaust gas oxygen sensor output changes states;
- means providing an indication of converter efficiency in relation to said pumping current amplitude occurring at said change in downstream exhaust gas oxygen sensor states; and
- an ignition controller retarding ignition timing a predetermined amount when said converter efficiency indication is less than a preselected amount.

14. The system recited in claim 13 further comprising an exhaust gas recirculation controller for increasing exhaust gas recirculation a predetermined amount when said converter efficiency indication is less than said preselected amount.

15. The system recited in claim 13 wherein said circuit pumps a predetermined fixed current before said pumping current in a gradually increasing amplitude and wherein said indicating providing means indicates degradation in one of said exhaust gas oxygen sensors if said downstream exhaust gas oxygen sensor output changes output states with said predetermined fixed current.

\* \* \* \* \*